Figure 1:
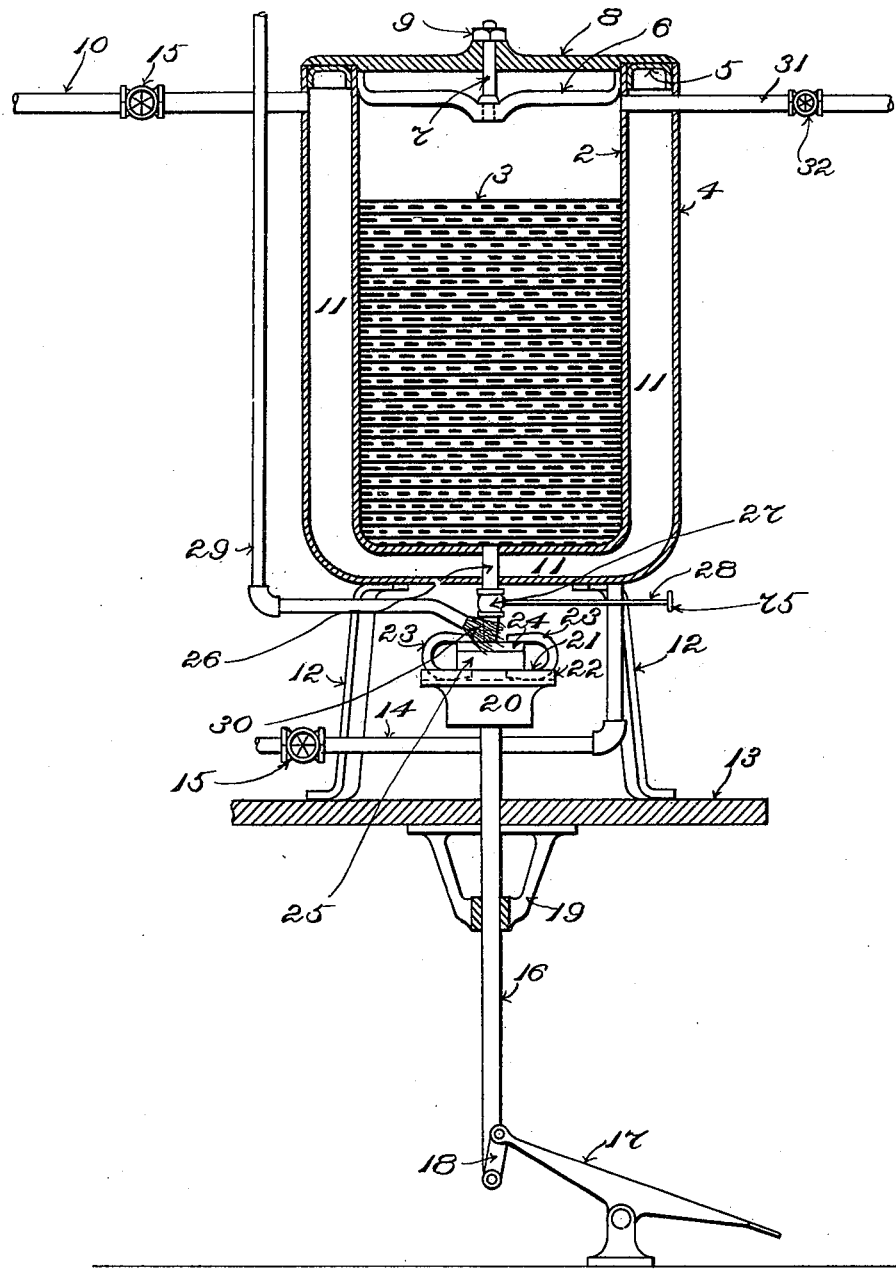

No. 654,184. Patented July 24, 1900.
H. M. SCHWARTZ.
BRUSH MACHINE.
(Application filed Nov. 16, 1899.)
(No Model.) 2 Sheets—Sheet 2.

Witnesses:
Oscar F. Hill
Edith J. Anderson

Inventor:
Herman M. Schwartz
by MacleodCalvord Randall
his Attorneys.

UNITED STATES PATENT OFFICE.

HERMAN M. SCHWARTZ, OF NORTHAMPTON, MASSACHUSETTS, ASSIGNOR TO THE FLORENCE MANUFACTURING COMPANY, OF SAME PLACE.

BRUSH-MACHINE.

SPECIFICATION forming part of Letters Patent No. 654,184, dated July 24, 1900.

Application filed November 16, 1899. Serial No. 737,150. (No model.)

*To all whom it may concern:*

Be it known that I, HERMAN M. SCHWARTZ, a citizen of the United States, residing at Northampton, in the county of Hampshire, State of Massachusetts, have invented a certain new and useful Improvement in Machines for Making Composition Brushes, of which the following is a specification, reference being had therein to the accompanying drawings.

Brushes comprising in their construction a back or body of wood or other suitable material and a bristle-block of so-called "cement" or composition having the tufts of bristles embedded therein are well known.

The manufacture of the bristle-blocks usually has been effected in the following manner: A block or die is provided having in the face thereof a cavity corresponding in shape and contour with the bristle-block to be produced and also having formed in it a series of holes opening into the said cavity and corresponding in arrangement, &c., with the tufts of bristles which are to be applied to the said bristle-block. The said holes are filled with bristles, one end of each tuft of bristles being allowed to project into the cavity of the said block or die. A mass of cement or composition in a plastic state from which a bristle-block is to be formed is placed in the cavity of the block or die, the quantity thereof being slightly in excess of the amount which is required to form the bristle-block. The block or die is of metal and at the time of being used preferably is heated, so that the plastic composition may not cool and harden too quickly after being applied thereto. The mass of composition having been placed, as above stated, in the die recess or cavity it is then subjected to pressure. Thereby the composition in its plastic condition is forced into the cavity and made to fill the same completely and to flow around and embed the projecting ends of the tufts of bristles. The excess of composition extending out of the cavity is then cleaned off, and after the composition in the block or die has cooled and hardened the bristle-block with the bristles embedded therein is removed. As will be noted, this method of production involves the use of heated dies. It further involves the cleaning off or removing of the excess of composition and the subsequent reheating of the latter to fit it for use in molding other bristle-blocks.

Certain of the objects of the present invention are to enable the use of heated dies to be avoided in the manufacture of the bristle-blocks which have been described and also the necessity for the removal of any excess of the composition which is used in forming the bristle-block.

One general object of the invention is to simplify, expedite, and cheapen the manufacture of brushes of the class aforesaid.

My invention consists in a machine of novel character by means of which the said objects are attained.

The invention is fully set forth in the following description, in which latter reference is made to the accompanying drawings, and the novel features thereof are pointed out and clearly defined in the claims at the close of this specification.

Figures 2, 3:
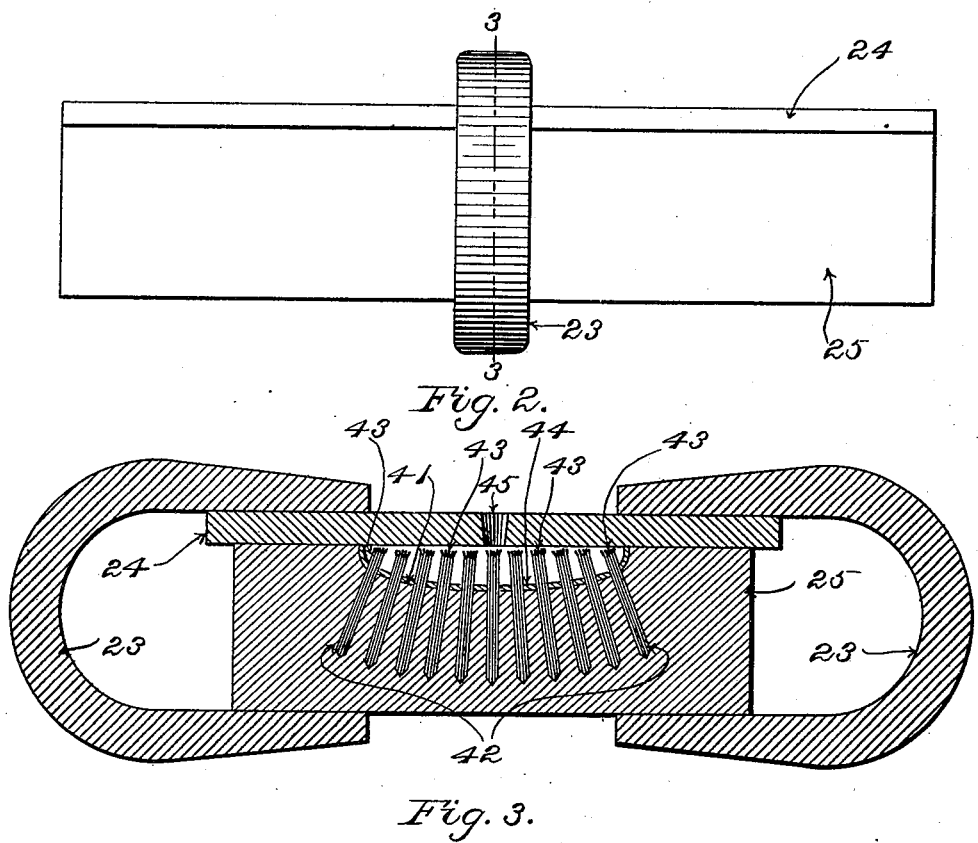

Having reference to the drawings, Figure 1 is a sectional elevation of one form of mechanism embodying my invention. Fig. 2 shows in side elevation a block or die, its cover-plate, and clamps holding the said parts together. Fig. 3 is a section on the plane indicated by the dotted line 3 3, Fig. 2, showing also bristles and a facing-plate in position in the block or die.

Reference being made first more particularly to Figs. 2 and 3, 25 designates a block or die on the order of that of which mention has been made, its cavity 41 being shown in Fig. 3, in which last the holes for the reception of the tufts of bristles are designated 42 42, the bristles being indicated at 43 43, and the perforated facing-plate, of thin sheet metal, for the bristle-block being indicated at 44. 24 is the cover-plate, which in carrying my present invention into effect is applied to the top of the block or die 25, so as to cover and close the cavity 41, the said plate having the feed-opening 45 therethrough. 23 23 indicate clamps serving to hold the cover-plate securely in place on the block or die 25.

In practice the perforated facing-plate 44, in case one is used, having been placed in the cavity of the block or die and the bristles having been inserted into the holes in the said facing-plate and block or die the cover-plate 24 is laid on top of the block or die and the clamps 23 23 are applied, as in Figs. 2 and 3, thereby securing the parts together. The latter are now placed in proper position in the machine, which is represented in Fig. 1, and cement or composition in a heated and plastic state is forced or injected into the cavity of the block or die 25, so as to fill the said cavity and cover or surround the inner ends of the bristles, thereby producing the bristle-block and securing the bristles in place in the latter.

I will now describe the further features of the invention with especial reference to Fig. 1. At 2 is shown the inner shell of a steam-jacketed vessel, the said shell being represented as containing a quantity of composition 3. The outer shell of the vessel is shown at 4, the two shells being suitably secured in any well-known manner. In the drawings they are shown as secured together by means of a connecting portion 5, which is riveted to the tops of the two shells 2 and 4. 6 is a spider-shaped piece within the shell 2, it having preferably three arms projecting outwardly from a central boss and the said arms being securely affixed to the upper portion of said shell. A bolt 7, secured in the boss, projects upwardly therefrom and through a hole formed centrally in a cover 8, a nut 9 on the top of the bolt above the cover serving to hold the cover 8 firmly in place on the vessel. 10 is an inlet-pipe through which steam may be admitted to the space 11 between the shells 2 and 4. The said space 11 extends wholly around the sides and bottom of the inner receptacle 2, and the steam, which is supplied thereto through the pipe 10 from a convenient source of steam-supply, (not shown,) serves to heat the receptacle 2 to maintain the composition 3 within the said receptacle in a high state of plasticity or semifluidity. An outlet-pipe 14 serves as a means of drawing off water of condensation and permitting a circulation of steam through the space 11, if desired. The pipes 10 and 14 are supplied with suitable valves 15 15 for closing them. The jacketed kettle may be conveniently supported—as, for instance, upon legs 12, which rest on a bench 13 or other suitable support. 16 is a vertically-movable rod which is connected at its lower end with a treadle 17 by means of a pivoted link 18, the said rod 16 passing upwardly through a hole in the bench 13, as also through a vertical bearing in the bracket or hanger 19. The said bracket or hanger 19 is secured underneath the bench 13 and serves, together with the bearing which the rod has in the bench 13, to guide and steady the rod as it is moved vertically by the foot of the operator upon the treadle. At the upper end of the rod 16 is a table or support 20, having a flat top 21, with a transverse groove therein, (indicated by dotted lines at 22.) The said groove 22 serves to receive the lower portions of the clamps 23, which are employed to hold the cover or upper portion 24 firmly upon and in contact with the top of the block or die 25. As will be clear, the precise means employed for clamping the cover 24 on the block or die 25 are not material, as any well-known means may be used for this purpose, and the groove 22 is therefore not essential to my device. An outlet 26 passes from the bottom of the inner receptacle 2 through the outer shell 4 and projects downwardly a sufficient distance below the said outer shell 4 to permit the placing in said pipe of a valve 27, by means of which the said pipe 26 may be opened or closed. The valve 27 is provided with a rod 28, which projects outwardly and has secured thereto a disk or handle 75, far enough away from the heated surfaces or parts of the apparatus, so that the said valve may be conveniently operated. By opening the valve 27 the highly-plastic composition 3 is allowed to pass downwardly through the outlet-pipe 26, the lower end of which is placed in the hole or opening 45 in the cover 24.

In connection with the outlet-pipe 26 I employ means to keep the said pipe hot and prevent any tendency in the plastic composition to harden as it passes through the said outlet-pipe. For this purpose a gas-pipe is shown at 29 and the flame thereof at 30, the said flame being caused to play upon the said outlet-pipe.

The operation of the machine is as follows: The rod 16 being in its lowest position, with the table 20 thereof depressed, the operator places on said table a block or die 25, containing bristles, as in Fig. 3, with or without a facing-plate 44, and having its cover 24 clamped thereon, as in Figs. 2 and 3. He then by means of foot-pressure applied to the treadle 17 raises the rod 16 and table 20, directing and positioning the die 25, so as to cause the lower end of the outlet-pipe 26 to enter the feed-opening 45 in the cover 24. He then opens the valve 27, allowing the plastic composition to flow into and fill the cavity in the said die. When the cavity of the die has been filled, he closes the valve 27, allows the rod 16 and table 20 to drop into their lowest position, removes the block or die 25 and its cover 24, with the securing-clamps, and then repeats the operation with another block or die.

It is to be understood that the precise details of construction and arrangement of the machine are not essential and may be varied as desired in practice.

It will be perceived that the elevation of the upper level of the cement or composition within the shell or receptacle 2 above the block or die is sufficient to cause considerable pressure in order that the cement or composition entering the cavity of the block or die may flow the same with enough force to cause all portions of such cavity to become perfectly filled and the inner ends of the bristles to become completely surrounded and effectually secured. In some cases the pressure which is due to the height of the upper level of the cement or composition will be sufficient. To meet all requirements of practice, however, I have embodied in the illustrated machine means of applying to the cement or composition which is contained within the shell or receptacle 2 pressure of any requisite degree in order to insure the quick downward flow of the plastic composition through the outlet-pipe 26 and into the cavity in the block or die. In the present case air-pressure is employed. Thus I provide a pipe 31, which is connected with a suitable supply of air under pressure. (Not shown.) The said pipe enters the top of the receptacle 2, thereby admitting air under pressure within the receptacle 2 above the composition 3. A suitable valve 32 is shown, by means of which the pipe 31 may be closed, if desired.

What I claim is—

1. A machine for making bristle-blocks for brushes, having a receptacle for plastic composition, a suitably-controlled outlet therefrom through which said composition may pass, molding devices having holes to receive bristles, a closed cavity into which the inner ends of the bristles project, and an opening leading to said cavity, and means for supporting the molding devices in position with the said opening in registration with the said outlet, substantially as set forth.

2. A machine for making bristle-blocks for brushes, having a receptacle for plastic composition, means for heating the same, an outlet therefrom and means for heating said outlet, molding devices having holes to receive bristles, a closed cavity into which the inner ends of the bristles project, and an opening leading to said cavity, and an adjustable support for said molding devices whereby the latter may be supported and moved to bring the opening therein into and out of registration with the said outlet, substantially as set forth.

3. A machine for making bristle-blocks for brushes, having a jacketed receptacle for plastic composition, means for supplying steam to said jacketed receptacle to heat the composition, an outlet from said receptacle having a shut-off valve therein, means for heating said outlet, molding devices having holes to receive bristles, a closed cavity into which the inner ends of the bristles project, and an opening leading to said cavity, and a vertically-movable support whereby the said opening may be moved into and out of registration with the said outlet, substantially as described.

4. A machine for making bristle-blocks for brushes, comprising molding devices having holes to receive bristles, a closed cavity into which the inner ends of the bristles project, and an opening through which composition may flow into the cavity, a receptacle in which composition is maintained in a relatively-elevated position to produce pressure of the same within the molding devices, means for applying heat to maintain said composition in a plastic condition, and an outlet through which the composition may pass from the receptacle into the molding devices, substantially as described.

5. A machine for making bristle-blocks for brushes, comprising molding devices having holes to receive bristles, a closed cavity into which the inner ends of the bristles project, and an opening through which composition may flow into the cavity, a receptacle in which composition is maintained in a relatively-elevated position to produce pressure of the same within the molding devices, means for applying heat to maintain said composition in a plastic condition, an outlet through which the composition may pass from the receptacle into the molding devices, and means to produce pressure upon the composition within the receptacle and thereby increase its pressure within the molding devices, substantially as described.

6. A machine for making bristle-blocks for brushes, comprising molding devices having holes to receive bristles, a closed cavity into which the inner ends of the bristles project, and an opening through which composition may flow into the cavity, a receptacle in which composition is maintained in a relatively-elevated position to produce pressure of the same within the molding devices, means for applying heat to maintain said composition in a plastic condition, an outlet through which the composition may pass from the receptacle into the molding devices, and means to introduce air under pressure into the receptacle to produce pressure upon the composition within the latter and thereby increase its pressure within the molding devices, substantially as described.

7. A machine for making bristle-blocks for brushes, having a receptacle for plastic composition, means of heating the contents of said receptacle to maintain the same in a highly-plastic condition, an outlet from the said receptacle having a valve to control the flow therefrom, a bristle-block die, and a support to hold said die in position beneath the said outlet to receive the plastic material as it flows therefrom, to fill the cavity of the said die, substantially as described.

In testimony whereof I affix my signature in presence of two witnesses.

HERMAN M. SCHWARTZ.

Witnesses:
WM. A. MACLEOD,
CHAS. F. RANDALL.